Aug. 7, 1934.　　　　R. E. KELLER　　　　1,969,560
AUTOMOTIVE TRANSMISSION
Filed April 13, 1931　　2 Sheets-Sheet 1

Fig. 1

INVENTOR.
Rex E. Keller,
BY
ATTORNEYS.

Patented Aug. 7, 1934

1,969,560

UNITED STATES PATENT OFFICE 1,969,560

AUTOMOTIVE TRANSMISSION

Rex E. Keller, Los Angeles, Calif.

Application April 13, 1931, Serial No. 529,665

36 Claims. (Cl. 74—336)

This invention relates to and has for a primary object the provision of an improved type of automatic transmission which combines all the features and advantages of the standard transmissions employed on motor vehicles with certain novel automatic features of my invention which will render the transmission capable of use for transmitting power thru different selective and positive gear trains to the vehicle, and means for automatically setting the mechanism whereby power in different ratios will be automatically transmitted to a driven shaft as the speed of the driven shaft is increased.

Briefly stated, this invention comprehends the embodiment in a standard automotive transmission mechanism of means self-contained in the transmission case as distinguished from a supplemental mechanism for imparting free wheeling characteristics to the transmission mechanism at all of the forward speeds successively as the speed of a driven shaft is increased.

Another object is to provide in combination with a standard automotive transmission one or more governors operated by the driven shaft for automatically changing the power ratio between the driving and the driven shafts as the speed of the driven shaft is increased to predetermined successive stages.

A further object is to provide in combination with a standard transmission mechanism and means for manually shifting the gears of the transmission to successively change the power ratio as the speed of the vehicle increases, certain automatically operable governor controlled devices which may be manually set by a single shift of the gear shift lever for rendering the positive gear shifting means ineffective and for rendering the governor controlled means effective for automatically changing the power ratio.

An important feature of this invention consists in the provision in each of the governor operated units of the transmission of a device in the form of a locking wedge so adjusted that the clutch can only make a change from one power ratio to another at a time when the power imparting members of the clutch have been retracted to a maximum extent. To this end the locking wedge is so designed and supported that the clutch cannot be operated unless it is locked in position against retraction.

Other and more detailed objects of invention will appear as the description progresses.

In the accompanying drawings I have shown a preferred embodiment of my invention, subject to modification within the scope of the appended claims without departing from the spirit thereof. In said drawings.

Figure 1:
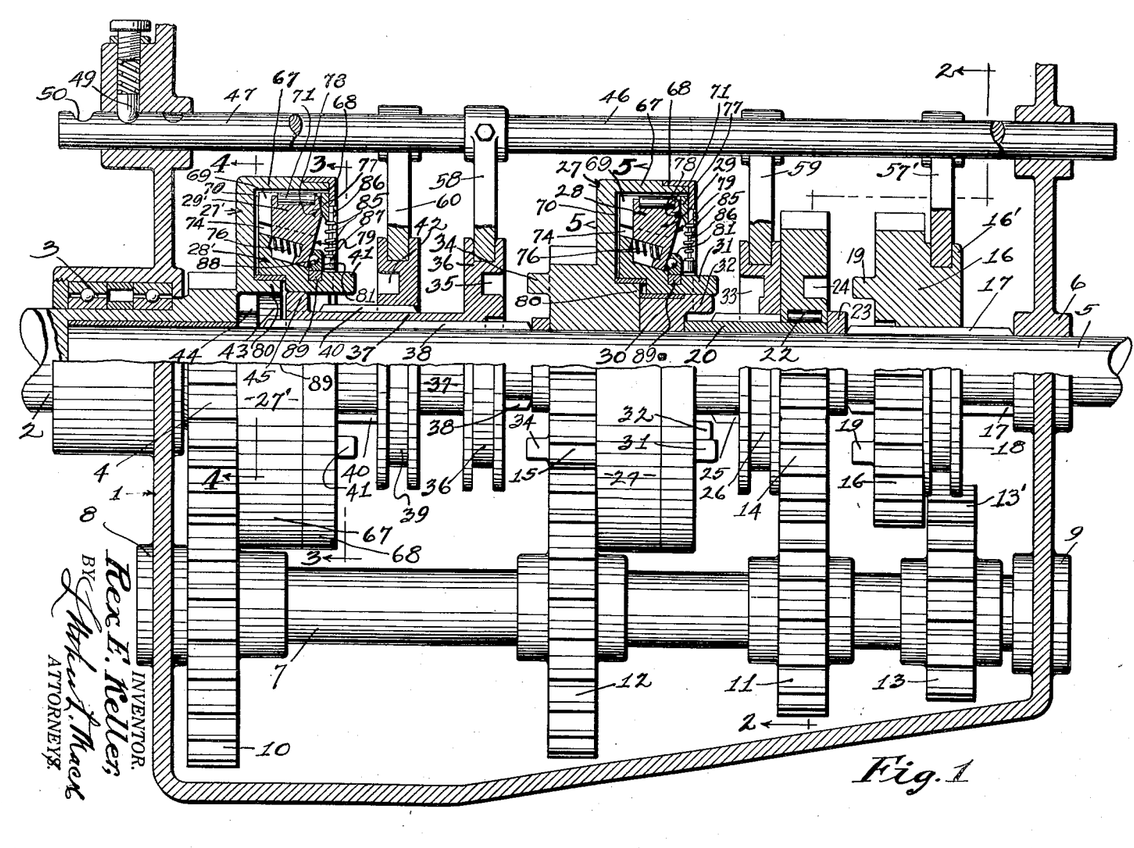
Fig. 1 is a longitudinal sectional elevation of a transmission case embodying my improvements and partly in section.

As generally arranged, I support the elements of my transmission mechanism in a typical gear case 1 in the forward end of which a driving shaft 2 is rotatably supported in a bearing 3. Said shaft is adapted for connection with or may be a continuation of the crank shaft of an engine or a motor, and is provided with a driving pinion 4 inwardly of the case 1. A driven shaft 5 is rotatably supported in a bearing 6 in the rear end of the case 1, and also telescopes into and is rotatable in the shaft 2 at the other end of the case. A counter-shaft 7 is provided as usual in parallel with but spaced substantially from the driven shaft 5, and is journaled in bearings 8 and 9 on the opposite ends of the transmission case 1.

The counter-shaft 7 has a gear 10 fixed thereto which meshes with and is driven by the pinion 4, and other gears 11, 12 and 13 are also fixed to the shaft 7 for applying power to the driven shaft 5 at low, second and reverse speeds, as in other types of transmissions. The gear 11 is in constant mesh with and drives a gear 14 which encompasses shaft 5, and gear 12 constantly meshes with and drives a gear 15 on shaft 5. The reverse gear 13 is adapted to be connected at will thru the medium of an idler gear 13' with a gear 16 on shaft 5. The gear 16 is slidable on and fixed to the shaft 5 by means of splines 17, 17 etc. and is provided on its rear side with an annularly grooved shift collar 18 and on its forward side with a plurality of positive driving lugs 19, 19 etc.

The gear 14 is loosely mounted on a sleeve 20 which in turn is loosely supported on shaft 5.

The gear 14 is provided with a plurality of eccentrically formed recesses 21 around the periphery of sleeve 20, in which rollers 22 are mounted for providing a differential clutch action between the gear 14 and sleeve 20. The gear 14 is held against movement in a right hand direction as seen in Fig. 1 by means of a collar 23 on shaft 5 interposed between the splines 17 and sleeve 20, and said gear has on its rear side a plurality of recesses 24 which are adapted to receive the lugs 19 on gear 16 when the gear 16 is moved in a left hand direction, for the purposes hereinafter stated.

The sleeve 20 has splines 25 thereon, and a shift collar 26 is slidable on said sleeve and said splines. The gear 15 is provided with an automatic governor controlled clutch, including a drum 27, a core 28, and a plurality of wedge clutch units 29 which are movable on the core and relative to the internal periphery of drum 27, as explained hereinafter in detail. The gear 15 is loosely mounted on shaft 5, and inwardly of said gear and of the core 28 a collar 30 is fixedly mounted on shaft 5 by means of a key or otherwise. The core 28 and the collar 30 have rearwardly extended lugs 31 and 32 respectively, which are adapted to engage recesses 33 formed in the left hand side of the shift collar 26 for purposes hereinafter explained. The left hand side of gear 15 is provided with lugs 34 which are adapted to engage recesses 35 formed in the adjacent side of a shift collar 36 which has an elongated and forwardly extended sleeve 37 splined to the shaft at 38 and slidable thereon. Another shift collar 39 is slidable on the sleeve 37 of collar 36 and is fixed thereto by means of splines 40.

The gear 4 is integral with or fixed to a drum 27' similar to the drum 27 which houses another governor controlled clutch unit including the core 28' and wedge clutch units 29'. The core 28' is provided with lugs 41 adapted to engage recesses 42 formed in the forward side of shift collar 39. The drum 27' is recessed at 43 and is provided with alternating lugs and spaces 44 which mesh with lugs 45 on the forward end of sleeve 37.

Thus, from the brief description of the mechanism, it will be understood that a positive low gear connection is established between the gears 14 and 16 when the lugs 19 of gear 16 are seated in the recesses 24 of gear 14, a positive second or intermediate gear connection is established between the shift collar 36 and gear 15 when the lugs 34 of said gear are seated in the recesses 35 of said collar, and a positive high gear connection is established between the gear 4 and shift collar 36 when the lugs 45 of sleeve 37 are engaged with the lugs 44 of gear 4 and drum 27'.

Figures 2, 3, 4, 5, 6, 7:
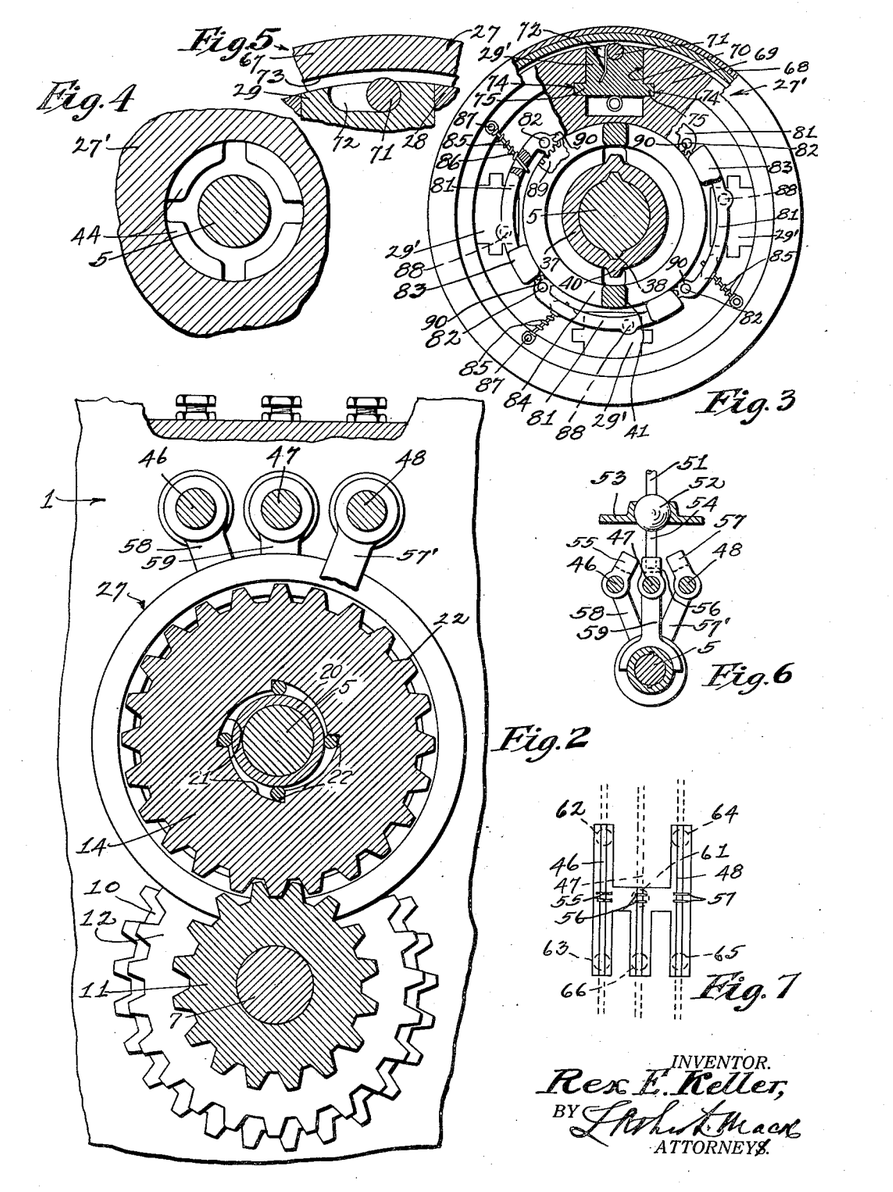
Fig. 2 is a transverse sectional elevation of the same on line 2—2 of Fig. 1.
Fig. 3 is a face view of one of the governor controlled clutch units partly in section, as seen on line 3—3 of Fig. 1.
Fig. 4 is a transverse section of the same on line 4—4 of Fig. 1.
Fig. 5 is a fragmentary section of one of the clutches on line 5—5 of Fig. 1.
Fig. 6 is a reduced scale view in elevation of the gear shifting means necessary for the operation of my transmission mechanism.
Fig. 7 is a diagram showing the different positions of the gear shifting lever for rendering the transmission effective for applying power at different speeds forward and reverse.

The shifting mechanism is shown in Figs. 1, 2 and 6 and includes a triplet of longitudinally slidable rods 46, 47 and 48, which are mounted on the opposite ends of the gear case 1 and are arranged as in other types of transmission with suitable spring urged detents, as at 49, adapted to engage grooves, as at 50, in the rods for holding the rods in the positions to which they may be moved.

The shifting mechanism is adapted to be connected as usual with a gear shift lever 51 having a universal joint 52 mounted in the top 53 of the transmission case and provided with a depending extension 54 which is adapted to be selectively engaged with slotted arms 55, 56 and 57 respectively held on the rods 46, 47 and 48. Thus, when the shift lever is rocked on its axis 52 the extension 54 will be caused to engage one of the arms 55, 56 or 57, and when rocked in a relatively right angular plane the corresponding rod will be moved longitudinally as in other types of transmissions.

The rod 46 carries a dependent fork 58 which is constantly engaged with a shift collar 36 and is operable for establishing an intermediate gear connection when the rod 46 is moved to the right as seen in Fig. 1 and for establishing a high gear or direct drive connection when the same is moved to the left. The rod 47 carries a pair of depending forks 59 and 60 which engage the shift collars 26 and 39 respectively, and the rod 47 is operative for setting the transmission for automatically changing the power ratios as the speed of the drive shaft is increased.

The rod 48 has a depending fork 57' which engages an annularly grooved extension 16' formed on the rear side of gear 16 whereby the gear 16 is shifted on shaft 5 when the rod 48 is actuated by the gear shift lever 51.

The diagram shown in Fig. 7 illustrates the movement of the standard gear shift lever 51 with neutral position indicated at 61, reverse at 62, low at 63, second or intermediate at 64, high or direct drive at 65, and a supplementary position for automatically changing the gears as indicated at 66. The automatic position is immediately back of the neutral position indicated at 61. Thus the lever 51 is shifted as in other standard types of transmission to the different positions shown for establishing the positive or conventional gear connections, while only one shift is necessary, and that is from neutral to automatic, for setting the mechanism to automatically change the power ratios of the gearing.

The drums 27 and 27' are similar in all respects except that the collar 30 is provided in the drum 27 internally of the core 28, while the sleeve 37 of collar 36 extends into the core 28' of the drum 27', for purposes hereinbefore described. The drums 27 and 27' have concentric rims 67 with annular keepers 68 secured to the outer edges of the rims and formed of annular cross section as shown. The cores 28 and 28' have disc-like bodies 69 with a plurality of radially formed recesses 70 therein in which the wedges 29 and 29' of the drums 27 and 27' are adjustably supported. Each of the wedges carries a roller 71 which, as shown in Fig. 5, is seated in a recess 72 in the outer face of the wedge, and said recess is shallower at one end than at the other so as to cause the roller 71 to grip the inner periphery 73 of the rim 67 when the clutch becomes effective.

The wedges 29 and 29' are slidably held in grooves 74, 74 formed on opposite sides of the recesses 70, and ribs 75, 75 are formed on the opposite side of the wedges for engagement with said grooves. Grooves 74 and ribs 75 are correspondingly inclined, as shown in Fig. 1, and the wedges are urged downwardly on the inclines into normal position by means of springs 76.

The recesses 70 are partially closed by means of abutments 77 which are integral with the cores 28 and 28' so that when the wedges are in normally disengaged positions the upper and outer portions 78 thereof will engage the inner side of the abutments 77 and thus limit the outward movement of the wedges. It will be observed, by reference to Fig. 1, that the faces 78 of the wedges are slightly beveled and are disposed at oblique angles with respect to the adjacent beveled portions 79, for purposes which will be hereinafter explained.

The cores 28 and 28' are rotatably mounted on inwardly extending hubs 80 formed on the drums 27 and 27' respectively, and suitable bearing sleeves as shown may be provided on said hubs for supporting the cores in operative position. Each of the drums 27 and 27' is provided with a centrifugal governor which includes a plurality of arms 81, 81 etc. pivotally mounted at 82 on the cores 28 or 28', as the case may be, and provided with weights 83 at their free ends. One of said arms is provided for each of the wedges 29 and 29'. The arms are normally held in retracted positions on an annular portion 84 of the core in each drum by means of compression springs 85 which may be arranged as shown and supported on rods 86 hooked over or thru the arms 81 and pivotally supported on the cores at points 87 so that the springs will compress between the arms and portions of the rod adjacent the pivots. Each governor arm may be provided as shown with a ball or roller 88 for engagement with the inclined face 79 of the associated wedge 29 or 29'.

The portions 84 of the cores are provided with ring gears 89 which mesh with sectors 90 on the axial portions of the governor arms 81. Said ring gears are loosely mounted on the cores and similarly connected with each of the associated governor arms so that in the rotation of the drums 27 and 27' the movement of all of the governor arms in each set will be equalized.

Having thus described the structure of the elements of my transmission mechanism I will now describe the operation thereof.

When the driving shaft 2 is rotated motion is continuously communicated to the counter-shaft 7 thru gears 4 and 10, thus effecting the continuous rotation of gears 12 and 15, 11 and 14, and the reverse drive gear 13. Gear 16 which is fixed to the driven shaft 5 is the only gear of the set which is normally out of mesh with its associated gear and when meshed with gear 13 thru the usual idler gear 13' serves to impart a reverse motion to the driven shaft. The continuous rotation of the permanently meshed gears as stated serves to rotate the drum 27 associated with the intermediate gear driving mechanism and the gear 14 which is associated with the low gear driving mechanism. The gear 14, however, is connected with the sleeve 20 by the roller clutch 22 so that said sleeve and its associated collar 26 will be rotated except at such times as will be hereinafter explained.

When the mechanism is to be operated in positive or conventional gear the lever 51, which is normally at neutral position 61 as shown in the diagram in Fig. 7, is moved to the left, thereby engaging the arm 54 with the member 57 on shift rod 48. The rod 48 is permanently connected with gear 16 by means of the engagement of the fork 57' with the shift collar 16' of said gear. The lever 61 is then moved rearwardly to the position 63 shown in the diagram and rod 48 is moved forwardly together with its fork 57' and gear 16, thus engaging the lugs 19 of said gear with the recesses 24 of gear 14. Thus lever 51 is operated to establish a positive low gear driving connection between gear 14 and shaft 5.

A shift from low to second gear, as in other types of transmissions, is accomplished by first moving lever 51 forwardly, thence to the right to its extreme of movement, and thence forwardly, thereby connecting arm 54 with the member 55 on rod 46 and sliding said rod rearwardly. Such movement of lever 51 disengages gear 16 from gear 14 and engages the shift collar 36 with the lugs 34 on gear 15, thereby establishing a positive intermediate gear connection.

The shift from intermediate to high gear is accomplished by moving the lever 51 rearwardly to the position 65 of the diagram and sliding rod 46, fork 58 and collar 36 forwardly so that the lugs 45 on sleeve 37 will engage the spaces between the lugs 44 on gear 4.

The shift to reverse gear is accomplished by moving lever 51 forwardly to the position 62 shown in the diagram, thereby moving rod 48, fork 57' and gear 16 rearwardly from the position shown in Fig. 1 to a position where gear 16 will mesh with the idler gear 13' which serves to connect gears 13 and 16.

When the mechanism is to be set for automatic change of the power ratio from low gear to intermediate gear and then to high gear, the lever 51 is moved rearwardly to the position 66 shown in the diagram of Fig. 7, thereby engaging the arm 54 with member 56 and effecting the forward movement of rod 47. The movement of rod 47 simultaneously moves the shift collars 26 and 39 into engagement with the lugs 31 and 41, respectively, of the cores 28 and 28' associated with drums 27 and 27'.

The clutch rollers 22 are so arranged that when gear 14 is rotated from the counter-shaft the sleeve 20 embracing driven shaft 5 will be correspondingly rotated together with the shift collar 26, and when said shift collar is engaged with the core 28 it will also be engaged with the lugs 32 of the collar 30 which is fixed to shaft 5. As the speed of shaft 5 increases with the elements in the arrangement just described, the governors 81 on core 28 will expand outwardly by centrifugal force, and the balls or rollers 88 thereof will move over the faces 79 of the wedges 29, thereby moving said wedges inwardly in the drums against the tension of their springs 76 and outwardly, due to the inclination of the grooves 74 in which the wedges are moved.

When shaft 5 attains a predetermined speed the wedges 29 will have been operated sufficiently to engage the rollers 71 thereof with the inner periphery of the rim 67 of drum 27. From the time that power is first applied thru the low gear 14 to shaft 5 until the rollers 71 become effective for gripping the drum 27, the drum 27 is rotating faster than the core 28 and gear 14. When the rollers 71, however, grip the drum 27, the speed of the core 28 will be synchronized with the drum 27.

The primary purpose of this invention is to so arrange the wedges 29 and 29' that a change cannot be made from one power ratio to another until and unless the rollers 71 are in the positions at the right of the grooves 72, as shown in Fig. 5. As the core 28, for instance, approaches a speed which is synchronous with the drum 27, the governors 81 will not have traversed the faces of the wedges outwardly of the apices of the angles formed by the portions 78 and 79 thereof. Altho the rollers 71 may at such times be positioned in the left hand ends of the grooves 72, as shown in Fig. 5, and actually in contact with the drum 27, said drum will have a tendency to drive back the wedges in opposition to centrifugal force so that the gripping action of the drum will not be sufficient to rotate the shaft 5.

At this point in the operation of the clutch an intentional slight deceleration of the shaft 2 will cause a slight lag of the drum 27, which will force the rollers 71 to the right of the grooves 72 to a sufficient extent to permit the further outward movement of the governors and wedges by centrifugal force due to momentum of shaft 5.

Simultaneously with the deceleration just mentioned the governor arms 81 will pass beyond the apices of the angles of the wedge and between the wedges and the abutments 77, thus locking the wedges in their expanded positions for maintaining the newly established speed.

When the engagement of the drum with the wedges 29 is effected, the drum, which is driven from the countershaft thru gears 12 and 15, picks up and serves to rotate the core 28, and thru said core, shift collar 26 and collar 30 serve to rotate shaft 5 synchronously therewith and continuously so long as shaft 5 receives power from the drum.

It will be understood that whenever the shift collar 26 is engaged with the core 28 of drum 27, the shift collar 39 is engaged with the core 28' of the drum 27'. Therefore, as the speed of shaft 5 is further increased to a predetermined extent the governors 81 of core 28' are expanded in the same manner as the governors hereinbefore described, and the wedges 29' of said core will grip the drum 27' and power will be applied to the shaft 5 from drum 27', and thence thru the core 28', shift collar 39 and sleeve 37.

When, however, the shaft 2 is decelerated so as to cause the rollers 71 to recede to the right to the lowermost part of the grooves 72, and then for any reason the speed of shaft 5 is decreased to such an extent that the centrifugal force no longer holds out the governors of core 28', the drum 27 will again apply power to shaft 5, and in like manner when the speed decreases beneath a nominal intermediate speed, power will be applied to the shaft 5 from gear 14 thru the roller clutches 22 as in the beginning.

When the mechanism is set for automatically changing the power ratio the lugs 31 of core 28 and the lugs 32 of collar 30 are all engaged with the recesses 33 of shift collar 26. Thus core 28, collar 30 and sleeve 20 and collar 26 rotate together.

It will be observed that free wheeling is provided in each of the three forward speeds. As long as the drive shaft 2 is pulling, the drums 27 and 27' rotate their cores 28 and 28' respectively, but when the foot of an operator is removed from the accelerator the engine idles and the motion of drive shaft 2 and the drums is retarded. In other words, the cores 28 and 28' which are in gear with the vehicle will rotate faster than the drums. In such case the rollers 71 of the wedges will be retracted into the deep portions of their recesses 72 so that actually the cores will run away from the drums and permit an accelerated speed of the vehicle without correspondingly accelerating the motor. This is true of both the high gear and intermediate gear drums.

The free wheeling action in the low gear is permitted by the clutch rollers 22 which rotate the sleeve when the engine is pulling in low gear, but when the speed of shaft 5 exceeds that of shaft 2 the sleeve 20 is permitted to rotate faster than the gear 14.

It will thus be understood from the foregoing description of my invention that I have not only provided a satisfactory free wheeling clutch which is capable of operation for two forward speeds as in other types of automotive transmissions, but I have additionally provided free wheeling action when the transmission is in low gear.

Moreover, I have provided an automatic gear shifting mechanism which is self-contained in the transmission and is associated with the free wheeling clutches so that only one shift is necessary when it is desired to utilize the free wheeling and automatic gear shifting mechanism. That one shift (from neutral to automatic) sets the entire mechanism for changing power ratios from low to intermediate and intermediate to high automatically as the speed of the driven shaft is accelerated.

In addition thereto, the mechanism shown and described herein can be accommodated in a standard transmission case with but slight modification, and incorporates all the advantages of a free wheeling transmission and an automatic gear shifting mechanism combined with a positive drive transmission and a manual gear shifting mechanism.

The most important factor of my invention is the locking wedges employed in connection with the power transmission clutches to prevent any lack of uniformity in the application of power from the driving to the driven members, and grabbing or jerking of the clutch members, when changes in the power ratio are effected. Furthermore, this locking mechanism more or less stabilizes the action of the governors and prevents their contraction even to a slight extent when any slight loss of speed below normal occurs. At the same time the locking devices are sufficiently sensitive so that when an appreciable loss of speed occurs the governors will automatically contract so as to step the power down to the established ratio in order to provide the necessary power ratio at such reduced speed.

It is, of course, evident that I may modify my invention from the form shown and described herein in structural details, arrangement and operation, without departing from the spirit of my invention or enlarging the scope thereof beyond that of the appended claims.

What I claim is:

1. An automotive transmission comprising driving and driven shafts, a speed changing clutch comprising a driving member continuously operated by said driving shaft, and a driven member operatively connected to said driven shaft and operated from said driving shaft initially through an overrunning clutch and at a slower rate than that of said driving member, a centrifugal governor rotatable with the driven member of said clutch, and a wedge grip carried by one of said members and slidable in a plane paralleling its axis and controlled by the operation of the governor during the rotation of the driven shaft for operatively connecting the driven member directly to the driving member of the clutch when the driven shaft attains a predetermined speed, whereby power may be applied to the driven shaft thru said clutch.

2. An automotive transmission as characterized in claim 1, having overrunning means included in said clutch permitting the free rotation of the driven member at a speed exceeding the corresponding speed of the driving member.

3. An automotive transmission comprising driving and driven shafts, a clutch including a driving member positively connected with said driving shaft, a core adapted for connection with the driven shaft and operated from said driving shaft initially through an overrunning clutch and at a slower rate than that of said driving member, a centrifugal governor rotatable with said core, and wedges rotatable with said core and adjustable thereon in paralleling the axis of said core for making gripping contact with the driving member of the clutch, said governor upon expansion thereof responsive to the rotation of the driven member at a predetermined speed being adapted to move said wedges into gripping contact with said driving member for connecting said core thereto whereby power will be applied to said driven shaft through said clutch.

4. An automotive transmission as characterized in claim 3, having overrunning clutch means included in said clutch whereby the rotation of the driving member of the clutch at a speed synchronous with the core will rotate the core while permitting the rotation of the core at a speed in excess of that of the driving member.

5. In an automotive transmission, a clutch including a driving member and a driven member, a plurality of wedges slidable in inclined planes paralleling the axis of and rotatable with the driven member, rollers movable in inclined planes at right angles to the axis of the core on said wedges into and from gripping contact with the driving member, centrifugally operable governors rotatable with the driven member and engaging said wedges for expanding the wedges as the speed of the driven member is increased for applying power from the driving member thru said rollers to the driven member, and means affording a one-way driving connection between said members for initiating the rotation of said driven member at a slower rate than that of said driving member.

6. An automotive transmission as characterized in claim 5, including means for locking said wedges and said rollers in operative connection with the driving member as described.

7. An automotive transmission as characterized in claim 5, including means preventing the operative engagement or disengagement of the driving and driven members until after the rollers of said wedges have been retracted to their lowest positions on their respective inclines.

8. In an automotive transmission including axially alined driving and driven shafts, an overrunning clutch having a driving member connected with the driving shaft, a driven member adapted for driving the driven shaft and driven from said driving shaft initially at a lower rate than that of said driving member, a one-way gripping device operatively mounted on one of said members and extensible into operative relation with the other of said members to provide a one-way driving connection between said members as the speed of the driven member is synchronized with that of the driving member, and centrifugal force responsive means operable upon rotation of said driven shaft at a predetermined rate and engageable with said gripping device for moving the same into operative relationship with said driving member.

9. In a variable speed transmission including a driving shaft and a driven shaft, a plurality of clutches associated therewith and having driving and driven members connected, respectively, with the driving and driven shafts at different steps of the transmission, said clutches including gripping devices carried by the driven members of the clutches extensible in the direction of and for engagement with the driving members of the clutches, independent means associated with each of said clutches and responsive to the momentum of the driven shaft in engagement with and for extending said gripping devices into operative engagement with said driving members for progressively connecting the driving and driven members of each of said clutches for automatically changing the power ratio between the driving and driven shafts as the speed thereof is increased, and means affording a one-way driving connection between said shafts for initiating the rotation of said driven shaft.

10. In a variable speed transmission including a driving shaft and a driven shaft, gearing affording direct and intermediate driving stages for driving said driven shaft at different rates relative to said driving shaft, an overrunning clutch associated therewith and positioned between the direct and intermediate driving stages of the transmission, said clutch having driving and driven members operatively associated, respectively, with the driving and driven shafts and rotating at different rates at such time as said driven shaft is being driven in an intermediate stage and including a one-way gripping device extensible in the direction of and for engagement with the driving member of the clutch, and independent means, associated with said clutch and responsive to the momentum of the driven shaft at such time as the same is being driven in an intermediate stage through said gearing, in engagement with and for extending said gripping device into operative engagement with said driving member to connect said clutch members for automatically changing the power ratio between the driving and driven shafts as the speed thereof is increased, and means on the driven clutch member and engaging said gripping device for opposing the extension of and for retracting the gripping device when the driven member is rotated at less than a predetermined speed.

11. In an automotive transmission including axially alined driving and driven shafts, an overrunning clutch on the driven shaft having a driving member connected with the driving shaft, and a driven member operatively associated with the driven shaft, said clutch including a one-way gripping device operatively mounted on the driven member and extensible into gripping relation with the driving member, and centrifugal force responsive means carried by the driven member engaging and adapted to extend the gripping device in the direction of and for gripping engagement with the driving member as the speed of the driven shaft is synchronized with that of the driving shaft, said driven member having a guide thereon, said gripping device slidably held on said guide whereby as the momentum of the driven member is increased the gripping device will be correspondingly extended under the influence of centrifugal force in the direction of the driving member, and means affording a one-way driving connection between said members for initiating the rotation of said driven member at a slower rate than that of said driving member.

12. In an automotive transmission including axially alined driving and driven shafts, means affording a one-way driving connection between said shafts for initiating the rotation of said driven shaft, an overrunning clutch having a driving member connected with the driving shaft, and a driven member operatively associated with the driven shaft, said clutch including a one-way gripping device operatively mounted on the driven member and extensible into gripping relation with the driving member, centrifugal force responsive means carried by the driven member engaging and adapted to extend the gripping devices in the direction of and for gripping engagement with the driving member as the speed of the driven shaft is synchronized with that of the driving shaft, said driven member having a guide thereon, said gripping device slidably held on said guide whereby as the momentum of the driven member is increased the gripping device will be correspondingly extended under the influence of centrifugal force in the direction of the driving member, and means on the driven member engaging said gripping device and tending to oppose the extension of said gripping device, said last mentioned means being effective for retracting the gripping device when and as the momentum thereof is decreased.

13. In an automotive transmission including axially alined driving and driven shafts, means affording an initial fixed ratio driving connection between said shafts, an overrunning clutch having a driving member connected with the driving shaft, and a driven member operatively associated with the driven shaft, said clutch including a gripping device operatively mounted on the driven member and extensible into gripping relation with the driving member, and centrifugal force responsive means carried by the driven member engaging and adapted to extend the gripping devices in the direction of and for gripping engagement with the driving member as the speed of the driven shaft is synchronized with that of the driving shaft, said gripping device having a friction roller adjustably held on its periphery for locking engagement with the driving member when the gripping device is extended to operative position.

14. In an automotive transmission including axially alined driving and driven shafts, means affording an initial fixed ratio driving connection between said shafts, an overrunning clutch having a driving member connected with the driving shaft, and a driven member operatively associated with the driven shaft, said clutch including a gripping device operatively mounted on the driven member and extensible into gripping relation with the driving member, and centrifugal force responsive means carried by the driven member engaging and adapted to extend the gripping devices in the direction of and for gripping engagement with the driving member as the speed of the driven shaft is synchronized with that of the driving shaft, said driven member having a peripheral recess therein forming a guide, said gripping member having means slidably engaging said guide whereby the gripping device is extended to operative engagement with the driving member.

15. In an automotive transmission including axially alined driving and driven shafts, means affording an initial fixed ratio driving connection between said shafts, an overrunning clutch having a driving member connected with the driving shaft, and a driven member operatively associated with the driven shaft, said clutch including a gripping device operatively mounted on the driven member and extensible into gripping relation with the driving member, and centrifugal force responsive means carried by the driven member engaging and adapted to extend the gripping devices in the direction of and for gripping engagement with the driving member as the speed of the driven shaft is synchronized with that of the driving shaft, said driven member having a peripheral recess therein forming a guide, said gripping member having means slidably engaging said guide whereby the gripping device is extended to operative engagement with the driving member, and yieldable means interposed between a portion of said driven member and said gripping device tending to oppose the extension of the gripping device but adapted to be counteracted by the momentum of the driven member and effective for retracting the gripping device when and as momentum of the driven member is decreased.

16. In an automotive transmission including axially alined driving and driven shafts, means affording an initial fixed ratio driving connection between said shafts, an overrunning clutch having a driving member connected with the driving shaft, and a driven member operatively associated with the driven shaft, said clutch including a gripping device operatively mounted on the driven member and extensible into gripping relation with the driving member, and centrifugal force responsive means carried by the driven member engaging and adapted to extend the gripping devices in the direction of and for gripping engagement with the driving member as the speed of the driven shaft is synchronized with that of the driving shaft, said driven member having a peripheral recess therein forming a guide inclined in a plane paralleling the axis of the driven shaft, said gripping member having means slidably engaging said guide whereby the gripping device is extended to operative engagement with the driving member, said gripping device having a friction roller adjustable on its periphery for locking engagement with the driving member when the driving member and driven member are synchronously rotated.

17. A variable speed power transmitting mechanism for providing a plurality of driving connections between the engine of a vehicle and the road wheels thereof having in combination, a driving shaft adapted to be driven by the engine of the vehicle, a driving clutch member rotatable with said driving shaft, a driven shaft connected to the road wheels of the vehicle, a driven clutch member associated with said driven shaft and adapted for driving the same, a train of gears around said clutch members providing a one-way drive between said shafts, centrifugal force responsive means carried by said driven clutch member and optionally operable at any time after the speed of rotation of the driven shaft attains a predetermined rate for automatically and operatively connecting said driving and driven clutch members for driving said driven shaft, and means for holding said centrifugal means in operative relationship with said driving clutch member to prevent the breaking of the operative connection between said driving and driven clutch members in the event of slight fluctuations of the speed of said driven shaft below said predetermined rate.

18. A variable speed power transmitting mechanism for providing a plurality of driving connections between the engine of a vehicle and the road wheels thereof having in combination a driving shaft driven by the engine of the vehicle, a driving clutch member rotatable by said driving shaft, a driven shaft connected to the road wheels of the vehicle, a driven clutch member associated with said driven shaft and adapted for driving the same, a train of gears around said clutch members providing a one-way drive between said shafts, and centrifugal force responsive means carried by said driven clutch member and optionally operable at any time after the speed of rotation of the driven shaft attains a predetermined rate for automatically and operatively interconnecting said driving and driven clutch members for driving said driven shaft.

19. A variable speed power transmitting mechanism for providing a plurality of driving connections between the engine of a vehicle and the road wheels thereof having in combination a driving shaft driven by the engine of the vehicle, a driving shaft clutch member rotatable with said driving shaft, a driven shaft connected to the road wheels of the vehicle, a driven shaft clutch member cooperable with said driven shaft for driving the same, a train of gears around said clutch members providing a one-way drive between said shafts, and centrifugal force responsive means carried by said driven shaft clutch member and operable whenever approximate synchronization of the speeds of rotation of said clutch members occurs subsequent to the attainment of a predetermined speed of rotation by said driven shaft for automatically effecting a driving relationship between said driving and driven clutch members for driving said driven shaft, said centrifugal force responsive means being adapted to break the driving relationship between said driving and driven clutch members when the speed of rotation of said driven shaft is substantially less than that at which said means becomes operable to effect a driving relationship between said driving and driven clutch members.

20. A variable speed power transmitting mechanism for providing a plurality of driving connections between the engine of a vehicle and the road wheels thereof having in combination a driving shaft driven by the engine of the vehicle, a driving clutch member rotatable by said driving shaft, a driven shaft connected to the road wheels of the vehicle, a driven clutch member cooperable with said driven shaft for driving the same, a train of gears around said clutch members providing a one-way drive between sa'd shafts, and centrifugal force responsive means carried by one said clutch members and operable at any time after the speed of rotation of said driven shaft attains predetermined rates to engage and disengage the other of said members for automatically effecting and breaking a driving relationship between said driving and driven clutch members, and means acting on said centrifugal force responsive means opposing the action of centrifugal force and operable for exerting different relative forces in opposition to centrifugal force when said means are in different positions respectively, whereby the same are operable for effecting the driving relationship between said driving and driven clutch members at a higher speed of rotation of said driven shaft than that at which said means are operable for breaking the driving relationship between said driving and driven clutch members.

21. A variable speed power transmitting mechanism for providing a plurality of driving connections between the engine of a vehicle and the road wheels thereof having in combination a driving shaft driven by the engine of the vehicle, a driving clutch member rotatable by said driving shaft, a driven shaft connected to the road wheels of the vehicle, a driven clutch member cooperable with said driven shaft for driving the same, a train of gears around said clutch members providing a one-way drive between said shafts, and centrifugal force responsive means carried by said driven clutch member and optionally operable subsequent to the attainment of predetermined speeds of rotation by said driven shaft to engage and disengage said driving member for automatically effecting and breaking a driving relationship between said driving and driven clutch members, said centrifugal force responsive means including means opposing the operation of said means to engage and disengage said driving clutch member so that there exists a minimum difference in the speeds of rotation of said driven shaft at which said means are operable for effecting and breaking the driving relationship between said driving and driven clutch members.

22. A variable speed power transmitting mechanism for providing a plurality of driving connections between the engine of a vehicle and the road wheels thereof having in combination, a driving shaft driven by the engine of the vehicle, a driving clutch member rotatable by said driving shaft, a driven shaft connected to the road wheels of the vehicle, a driven clutch member cooperable with said driven shaft for driving the same, a train of gears around said clutch members providing a one-way drive between said shafts, centrifugal force responsive means carried by said driven clutch member and cooperable with said driving clutch member for automatically effecting and breaking a driving relationship between said driving and driven clutch members, means operable for detaining operation of said centrifugal force responsive means until approximate synchronization of the speeds of rotation of said driving and driven clutch members occurs at any time subsequent to the attainment of a predetermined speed of rotation by said driven shaft and clutch member, said means being operable upon release of torque between said driving and driven shafts at any time subsequent to the attainment of a substantially lower predetermined speed of rotation by said driven shaft and clutch member for automatically breaking the driving relationship between said driving and driven clutch members, and means opposing the operation of said centrifugal force responsive means to disengage said driving clutch member until the speed of rotation of said driven shaft is substantially less than that at which said centrifugal force responsive means is operable to engage said driving clutch member.

23. In an automatic transmission, the combination of a driving shaft with a driven shaft, a clutch for operatively connecting said shafts including a driving clutch member rotatable by said driving shaft, a driven clutch member operatively connected to said driven shaft and adapted for driving the same, means affording a one-way driving connection between said shafts and around said clutch members, centrifugal force responsive locking means carried by one of said clutch members and optionally operable at any time after the speed of rotation of the driven shaft attains a predetermined rate to engage the other of said clutch members for automatically and operatively interconnecting said driving and driven clutch members for driving said driven shaft around said one-way driving connection, and means associated with said locking means for detaining operation of the same until the driving member is brought to a speed synchronous with that of said driven member.

24. A variable speed power transmitting mechanism having in combination a driving shaft, a driven shaft, a centrifugally actuated clutch operable responsive to variations in the rotative speed of said driven shaft above and below predetermined rates and having driving and driven members operatively connected to said driving and driven shafts, respectively, and centrifugal force responsive means carried by one of said members and operable for connecting the same to the other of said members for effecting a high ratio driving connection between said shafts, means affording a free wheeling drive around said clutch for providing a lower ratio driving connection between said shafts upon disengagement of said clutch members, said clutch embodying means operable for detaining operation of said centrifugal force responsive means for preventing the connection of said members to effect a driving connection through said clutch and between said shafts until the speed of said members has been substantially synchronized.

25. In a device for providing a variable speed drive between axially aligned driving and driven shafts, an overrunning clutch cooperable with the driving and driven shafts for providing a one-way driving connection between the same, automatic clutch means for connecting the driving and driven shafts around said overrunning clutch for positively operating the driven shaft at a faster rate than that provided by said one-way driving connection and comprising a driving clutch member connected to said driving shaft to be driven thereby, a driven clutch member operatively connected to said driven shaft for driving the same, locking means associated with one of said clutch members and operable at any speed thereof above a predetermined rate of rotation of said driven shaft to engage with the other of said clutch members for increasing the speed at which the driven shaft is driven with respect to that of the driving shaft, and means for preventing the operation of said locking means until the speed of said driving and driven clutch members has been synchronized, and selectively operable shiftable means for connecting the driving shaft with the driven shaft around said overrunning clutch and said automatic clutch means.

26. A transmission mechanism comprising driving and driven shafts, an overrunning clutch operative for providing a one-way driving connection between said shafts, automatic means for connecting said shafts around said overrunning clutch for driving said driven shaft at a rate higher than that by said one-way driving connection and including a driving clutch member operatively connected to said driving shaft to be driven thereby, a driven clutch member operatively connected to said driven shaft and locking means associated with said driven clutch member and operable responsive to centrifugal force resulting from rotation thereof at any speed above a predetermined rate of rotation thereof for engagement with said driving clutch member for driving said driven shaft at an increased rate of rotation thereof with respect to that of said driving shaft, and means for preventing the operative engagement of said locking means with said driving clutch member until the rotative speed of said driving clutch member substantially is reduced to that of said driven clutch member.

27. In a variable speed power transmitting mechanism, the combination of a power operated driving member, a load resisted driven member, means including an overrunning clutch operated by said driving member for providing a one-way driving connection between said members whereby said driven member may overrun said means, a clutch having elements operatively connected to said driving and driven members, and operable for connecting said driving and driven members at an increased speed ratio and locking means carried by one of said elements operable responsive to changes in speed of said driven member for connecting said clutch elements, and being provided with means for preventing the operation thereof to effect an increase in the speed ratio of the driven member until the speed of said driving member is first substantially reduced to approximately that of said driven member after the rotative speed of said driven member attains a predetermined rate.

28. In a variable speed power transmitting mechanism, the combination of a power operated driving member, a member adapted to be connected thereto to be driven thereby, means providing a one-way driving connection between said members for driving said members at different rates and whereby said driven member may overrun said means, a locking member carried by one of said members and operable responsive to centrifugal force to engage the other of said members to connect said driving and driven members together for increasing the ratio of the driving connection between the same and whereby said driven member will overrun said first mentioned connection between said members and said locking member being provided with means operable during such time as said members are being rotated at different rates for preventing the operation of said locking member until the rotative speed of said driving member is momentarily substantially reduced to approximately that of said driven member.

29. In a variable speed power transmitting mechanism, the combination of a power operated driving member, a load resisted driven member, means for providing a one-way fixed ratio driving connection between said members, a centrifugally operable locking means carried by one of said members for connecting said driving and driven members to increase the ratio of the driving connection between said members above that provided by the one-way drive, and including means for rendering said locking means ineffective for connecting said members until the same are brought to approximately a synchronous speed.

30. In a variable speed power transmitting mechanism, the combination of a power operated driving member, a load resisted driven member, means for providing a fixed ratio one-way driving connection between said members for rotating the same at different rates, whereby said driven member may overrun said driving member, a centrifugally actuated locking element carried by one of said members automatically operable to connect said driving member to said driven member independently of said means whereby the driving member will rotate said driven member at an increased speed ratio, said centrifugally actuated element being operative responsive to centrifugal force resulting from rotation of said driven member at a predetermined rate and embodying means for preventing the operation thereof so long as the driving member thereof exceeds the speed of the driven member thereof but operable to permit the operation thereof as soon as said driving and driven members are brought to approximately synchronous speeds.

31. A variable speed power transmitting mechanism having in combination a driving shaft, a driven shaft in axial alignment therewith and rotatable independently thereof, means providing an initial free wheeling driving connection between said shafts to permit said driven shaft to rotate at a rate of speed in excess of that of said driving shaft, and a clutching mechanism operable responsive to centrifugal force resulting from rotation of one of said shafts for automatically effecting a driving connection at an increased ratio between the shafts, means for detaining the operation of said clutching mechanism until any selected speed above a predetermined rate of rotation of said driven shaft is attained and operable to permit free rotation of said driven shaft in the same direction but at a greater speed of rotation than that of said driving shaft.

32. In a variable speed power transmitting mechanism including axially aligned driving and driven shafts, means affording an initial driving connection between said shafts, a plurality of clutches associated therewith each having driving and driven members connected respectively with the driving and driven shafts at different steps of the transmission, means carried by said driven member operable responsive to centrifugal force resulting from rotation of said driven shaft for cooperation with said driving member for automatically changing the speed ratio between the driving and driven shafts as the speed thereof is increased and decreased, and means for preventing the change in the speed ratio as the rotative speed of the driven shaft is increased until the rotative speed of said driving clutch members momentarily are substantially reduced periodically to approximately that of the corresponding driven members.

33. A variable speed power transmitting mechanism for providing a driving connection between the engine of a vehicle and the road wheels thereof and having in combination a driving shaft driven by the engine of the vehicle, a driving clutch member rotatable by said driving shaft, a driven shaft connected to the road wheels of the vehicle, a driven clutch member associated with said driven shaft and adapted for driving the same, means providing a one-way drive around said clutch members and between said shafts, and centrifugal force responsive means carried by one of said clutch members and optionally operable at predetermined rates of rotation of said driven shaft for automatically effecting and breaking a driving relationship between said driving and driven clutch members, means for detaining operation of said means to effect a driving relationship between said members until the same are brought to an approximately synchronous speed, and means operable for detaining the operation of said centrifugal force responsive means to break the driving relationship between said driving and driven clutch members until the speed of said driven shaft is substantially less than that at which said driving relationship was effected.

34. Power transmission mechanism for providing a plurality of driving connections between the engine of a vehicle and the road wheels thereof having in combination a driving shaft adapted to be driven by the engine of the vehicle, a driven shaft connected to the road wheels of the vehicle, a driving clutch member operatively associated with said driving shaft, a driven clutch member operatively associated with said driven shaft, means affording a one-way driving connection between said shafts and said clutch members for driving said clutch members at different rates, a plurality of locking elements carried by one of said members operable responsive to changes in centrifugal force to engage the other of said clutch members for connecting said members whereby power will be applied to the driven shaft through said clutch, means for detaining the operation of said locking elements to engage said clutch member until the relative rotation between said clutch members has been substantially eliminated, and means operatively connected to each of said locking elements for preventing a movement of one of said locking elements without a corresponding movement of the other.

35. Transmission mechanism having in combination driving and driven shafts, means including an overrunning clutch and a two-way clutch selectively operable for affording one-way and two-way initial driving connections, respectively, between said shafts, a centrifugally actuated clutch operable, upon the attainment by said driven shaft of a predetermined rate of speed, and only during such time as said initial driving connection is provided through said overrunning clutch, for connecting said driven shaft to said driving shaft to be driven at a higher rate than that at which the same is driven through said overrunning clutch, and progressively operable shiftable means for shunting said centrifugally actuated clutch out of the driving connection between said shafts and establishing a two-way driving connection through said two-way clutch.

36. In a transmission mechanism having a driving shaft and a driven shaft with clutch mechanism for operatively interconnecting said shafts including an overrunning clutch operatively associated with each of said shafts for providing a one-way drive therebetween, a centrifugal clutch having driving and driven members operatively associated with each of said shafts, respectively, and means associated with one of said clutch members and operable responsive to centrifugal force resulting from rotation thereof and at any speed thereof above a predetermined rate and upon approximate synchronization of the rotative speeds of said members for connecting said clutch members to provide a drive between said shafts at a higher ratio than said one-way drive, said overrunning clutch being adapted to permit said driven shaft to overrun the same during the operation of said centrifugal clutch.

REX E. KELLER.